UNITED STATES PATENT OFFICE.

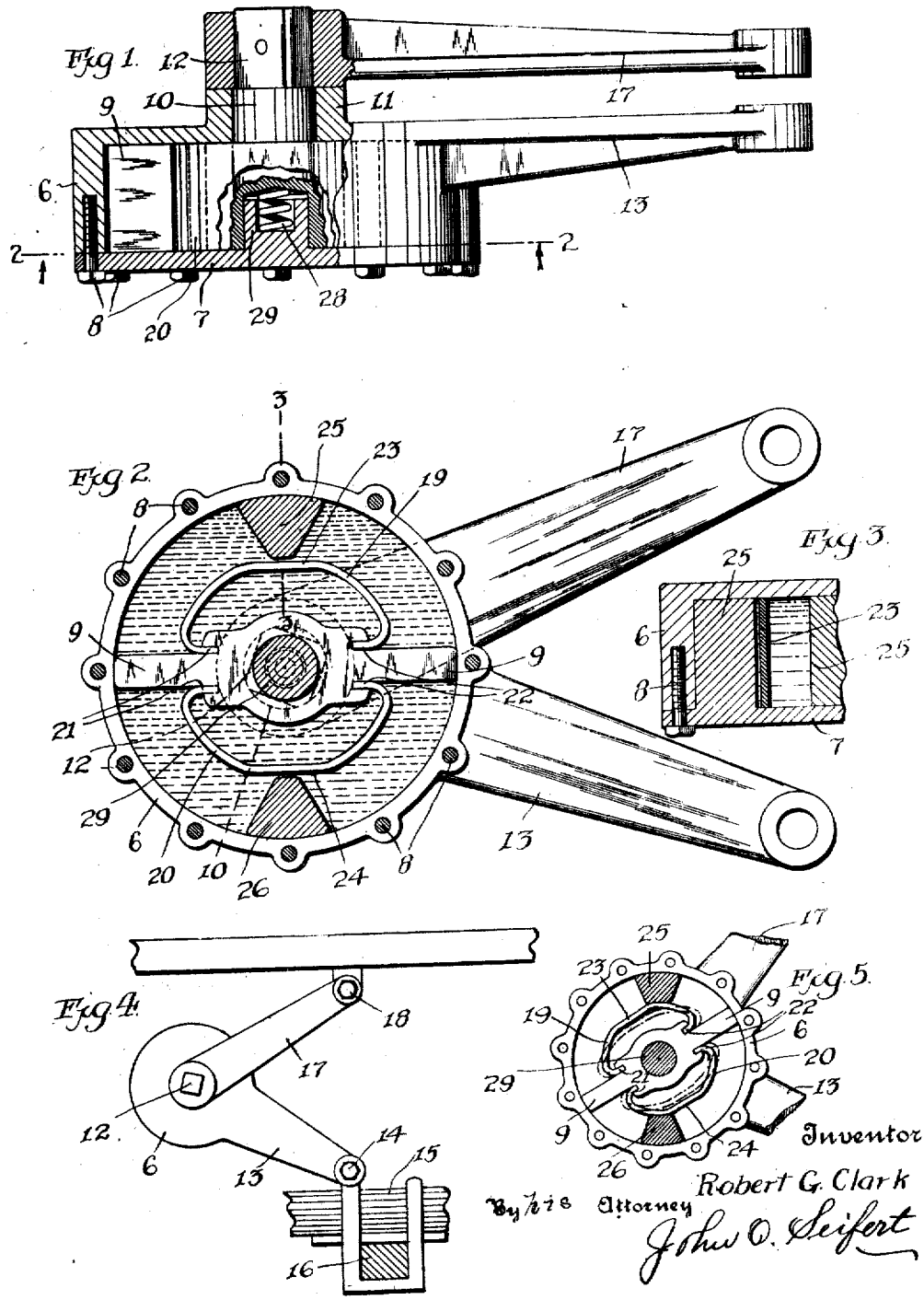

ROBERT G. CLARK, OF BROOKLYN, NEW YORK.

SHOCK-ABSORBER.

1,290,912.　　　　Specification of Letters Patent.　　Patented Jan. 14, 1919.

Application filed June 1, 1917. Serial No. 172,139.

*To all whom it may concern:*

Be it known that I, ROBERT G. CLARK, a citizen of the United States, and a resident of the borough of Brooklyn, in the county of Kings, city and State of New York, have invented certain new and useful Improvements in Shock-Absorbers, of which the following is a specification.

This invention relates to devices to absorb the shocks transmitted from the wheels of a vehicle to the vehicle body through the spring suspension in driving over uneven road surfaces and encountering obstructions, and it is the object of the invention to provide a device of this character in which the shocks are absorbed and the retractile or rebounding movements of the spring or springs of the suspension retarded through the medium of a fluid, and to provide a device which is simple and cheap in construction and efficient in operation.

Another object of the invention is to provide a shock absorber which is adjustable to readily adapt it to various forms of spring suspensions and vehicles.

In the drawing accompanying and forming a part of this specification Figure 1 is a sectional plan view of a shock absorber for the spring suspension of vehicles showing an embodiment of my invention.

Fig. 2 is a sectional side elevation taken on the line 2—2 of Fig. 1 looking in the direction of the arrows.

Fig. 3 is a fragmentary sectional view taken on the line 3 of Fig. 2.

Fig. 4 is a side elevation of the shock absorber showing the manner of applying the same to the frame and axle of a vehicle; and Fig. 5 is a sectional side elevation on a reduced scale showing the positions of the parts in full lines during the contracting and retractile action of the spring or springs or the suspension of a vehicle, and in dotted lines the positions certain parts will assume to permit of the quick movement of the fluid in the casing when the vehicle spring is subjected to a sudden shock.

Similar characters of reference designate like parts throughout the different views of the drawing.

The embodiment of my invention shown in the drawing comprises a cylindrical casing 6 having an opening at one side to be closed by a cover 7 removably secured to the casing by bolts 8, the casing being adapted to carry a fluid or liquid as shown in Fig. 2. A piston comprising diametrically oppositely extending wing pistons 9 is supported to oscillate in the casing by a trunnion or hub 10 projecting axially therefrom and rotatably engaging in an opening in a boss 11 of the casing and having the projecting end 12 squared. The casing has a radially extending arm 13 whereby the casing is pivotally supported, as at 14, by an axle 16 through the connection of a suspension spring 15 thereto. Secured to the squared end 12 of the piston trunnion 10 is an arm 17 to pivotally connect the piston, as at 18, to another part of the vehicle, such as the frame of the vehicle.

The pistons 9 extend to the circular walls of the casing and are shaped to conform to the cross sectional form of the casing thereby separating the casing into disconnected chambers as clearly shown in Fig. 2. Resilient members 19, 20 are carried at opposite sides of the pistons and are movable therewith. These resilient members are in the form of outwardly bowed springs with the free ends bent to lie contiguous to the sides of the pistons and engage in recesses in the pistons adjacent the piston hub, as shown at 21 and 22, Figs. 2 and 5. The springs 19 and 20 have flattened portions 23, 24 which in the normal position of the pistons are adjacent to but spaced from abutments 25, 26 projecting from the cover into the casing to extend transversely thereof, the side walls of the abutments preferably converging inwardly as shown. The springs coöperate with the abutments to divide or separate the chambers at opposite sides of the pistons into intercommunicating chambers, the space between the abutments and the springs affording a communication between such chambers.

It will be obvious that when the cover is secured in place the casing will be filled with a fluid and be fluid tight, and to provide a fluid tight joint between the piston trunnion 10 and its bearing in the casing boss 11 without the use of a stuffing box or the like a spring 28 is provided to yielding urge the piston in a direction toward the piston trunnion, this spring being seated in a recess in an inwardly extending lug 29 on the cover, said lug engaging in a recess of the hub of the pistons and also serving to rotatably support the pistons.

The operation is substantially as follows, assuming the device is secured to a vehicle frame and axle as shown in Fig. 4 with the parts in position as shown in Fig. 2. As the vehicle is driven over a substantially even roadway and slight vibrations or shocks transmitted from the wheel axle to the body through the spring suspension and a slight movement imparted to the arms 13, 17 relative to and away from each other the fluid in the casing at opposite sides of the pistons will be caused to gradually and freely move or flow to and fro between the chambers provided by the abutments and bowed spring members through the pressure upon said abutments and spring members of the fluid through the movement of the pistons which are imparted to the latter through the arms 13, 17 by the vehicle springs, the mobility of the fluid or liquid and the pressure thereof on the spring members causing the latter in conjunction with the vehicle springs to absorb any such slight vibrations or shocks. Should a sudden shock be imparted to a vehicle wheel and thereby a sudden contracting or retracting movement of the vehicle springs, as by the vehicle wheel running into a depression or encountering an obstruction, the sudden impact or pressure of the pistons on the fluid will cause the spring members to be flexed, substantially as shown in dotted lines in Fig. 5, it being assumed that the vehicle spring or springs are having a retractile movement due to a wheel running into a depression and the axle having a movement away from the vehicle body and thereby the arms 13, 17 spread apart or moved away from each other. During the initial movement of the pistons the spring members will tend to resist the movement thereof through the fluid and thereby react against the action of the vehicle spring or springs, but the sudden impact of the fluid against the spring members and the pressure of the pistons against the fluid will flex the same thereby increasing the communicating area between the spring members and abutments and thereby permit the ready flow of the fluid from one chamber to the other. After the shock has been transmitted from the wheel axle to the vehicle body, or the suspension springs have reached the limit of their retractile movement or rebound (as shown in Fig. 5) a curved portion of the spring members between the connection of said members with the pistons and the flattened portion will engage with the abutments, shutting off communication between the respective chambers and preventing the reverse flow of the fluid from one chamber to another, the spring members tending to resist or retard the sudden retractile movement of the vehicle springs until such time as the retractile power or force of the vehicle springs through the pressure of the pistons on the fluid will overcome the inherent tension of the spring members 19, 20 and flex the latter to permit of the flow of the fluid from the chambers at one side of said spring members to the chambers at the opposite sides thereof, and as the retractile force or power of the vehicle springs diminishes as said springs approach their normal positions this return movement of the vehicle springs will be gradual until the pistons again assume the positions shown in Fig. 2 with the free but restricted passage of the fluid between the chambers at opposite sides of the abutments and spring members 19, 20.

It will be readily understood that the function of absorbing shocks depends upon the resiliency of the spring members 19, 20 and the action of said members to resist the pressure of the fluid thereon through the pistons, and that the inherent tension of these spring members must be varied in accordance with the weight of the vehicle in connection with which the shock absorber is used.

The abutments and pistons are so arranged that they will be substantially at right angles to each other in the normal compression position of the vehicle springs. To adjust the shock absorber to adapt it to various kinds of vehicles and to the normal compression position for the springs of the suspension, such for instance as to move the casing supporting arm 13 and the piston arm 17 closer together and still maintain the abutments and pistons substantially at right angles in the normal compression position of the vehicle springs the cover is moved so that the abutment at the top will be moved to the right and the abutment at the bottom to the left from the positions shown in Fig. 2 a distance equivalent to the space between two bolt securing openings in the casing. Should it be necessary to spread the arms from the position shown in Fig. 2 to accommodate the device to the normal compression position of the vehicle springs the cover is adjusted so that the abutment at the top is moved to the left and the abutment at the bottom to the right from the positions as shown in said Fig. 2.

Having thus described my invention, I claim:

1. The combination with the spring suspension of a vehicle to movably connect parts of a vehicle to have movement relative to and away from each other, of a fluid containing casing connected to one of said parts at a point eccentric to the axis of the casing; a piston rotatable in the casing connected at a point eccentric to the axis of the piston and casing to the other of said movable parts of the vehicle; an abutment in the casing; and a resilient member movable with the piston and coöperating with the casing abutment to divide the casing into communicating chambers, said resilient member being operable to regulate the communicating area between the chambers in accordance with the pressure of the piston on the fluid in the casing.

2. In a vehicle the combination with a spring to suspend the vehicle body from the axle, of a fluid containing casing; a piston to oscillate in the casing; means to connect either the casing or the piston to the axle and the other to the vehicle body; an abutment in the casing; and resilient means carried by and rotatable with the piston coöperating with the abutment to divide the casing into communicating chambers and varying the areas of the chambers and adapted to regulate the communicating area between the chambers to retard and absorb the contracting and retractile movements of the suspension spring by the pressure of the fluid through the movements of the piston.

3. In a vehicle the combination with the spring suspension thereof, of a fluid containing casing; a piston to oscillate in said casing; means to connect said casing and piston to different parts of the vehicle having movement relative to and away from each other through the action of the spring suspension; an abutment in the casing and resilient means movable with the piston and coöperating with the abutment to permit the flow of fluid from one to the opposite side of the piston in the casing during the movement of the piston and casing to retard the contracting and retractile movements of the springs of the suspension for the purpose specified.

4. In a vehicle the combination with the spring suspension thereof, of a fluid containing casing; a piston to oscillate in said casing; means to connect said casing and piston to different parts of the vehicle having movement relative to and away from each other through the action of the spring suspension; an abutment in the casing; and a resilient member movable with the piston to coöperate with said abutment to divide the casing into communicating chambers and operable to regulate the communicating area between the chambers in accordance with the pressure of the piston on the fluid in the casing to retard the contracting and retractile movements of springs of the suspension for the purpose specified.

5. A shock absorber for the spring suspension of a vehicle, comprising a fluid carrying casing; a wing piston to oscillate in the casing; an abutment in the casing extending thereinto from the outer wall; a resilient member carried by and movable with the piston to lie contiguous to and coöperate with the inner end of the abutment to separate the casing into communicating chambers and vary the area of the chambers and adapted to regulate the communicating area between the chambers by the pressure of the fluid through the movements of the piston for the purpose specified.

6. A shock absorber for the spring suspension of a vehicle, comprising a fluid carrying casing; a wing piston to oscillate in the casing; an abutment in the casing extending inward from the outer wall; a bowed resilient member carried by and movable with the piston coöperating with the inner end of the abutment to divide the same into communicating chambers, substantially as and for the purpose specified.

7. A shock absorber for the spring suspension of a vehicle, comprising a fluid carrying casing having a radially extending arm to support the same; a wing piston pivotally supported in the casing; a radially extending arm connected co-axially to the piston; said casing and piston adapted to have rotative movement in opposite directions; and abutment extending inward from the outer wall of the casing; and a resilient member carried at the side of the piston to coöperate with the abutment to separate the casing into communicating chambers.

8. A shock absorber for the spring suspension of a vehicle, comprising a fluid carrying casing having a radially extending arm; diametrically oppositely extending wing pistons pivotally supported in the casing; an arm connected co-axially to the pistons; diametrically opposite abutments in the casing; outwardly bowed springs carried at opposite sides of the piston coöperating with the abutments to separate the casing at opposite sides of the pistons into communicating chambers, substantially as and for the purpose specified.

9. A shock absorber for the spring suspension of a vehicle, comprising a fluid carrying casing; a wing piston to oscillate in the casing; an abutment in the casing; extending inward from the outer wall and an outwardly bowed spring carried by and movable with the piston having a flat portion normally adjacent the inner end of the abutment to separate the casing into communicating chambers.

10. A shock absorber for the spring suspension of a vehicle, comprising a fluid carrying casing; a wing piston to oscillate in the casing, an abutment in the casing; extending inward from the outer wall and an outwardly bowed spring member carried by and movable with the piston, said member having a flat portion normally adjacent to but spaced from the inner end of the abutment to coöperate with the abutment to normally separate the casing into communicating chambers, and said spring being arranged to have a curved portion of the spring engage the abutment and shut off communication between the chambers as the piston moves and adapted to be flexed by the pressure of the fluid through the movement of the piston by the action of the spring suspension to open and control the communication between the chambers.

11. A shock absorber for the spring suspension of a vehicle, comprising a fluid carrying casing; a wing piston to oscillate in the casing; diametrically opposite abutments in the casing; outwardly bowed spring members carried at opposite sides of and movable with the pistons, said members having a flat portion normally opposite to but spaced from the abutments to separate the casing at opposite sides of the pistons into communicating chambers, said springs being arranged to have a curved portion engage the abutments when the pistons move to shut off communication between the respective chambers and adapted to be flexed to open communication between the chambers and regulate the communicating area between the chambers in accordance with the pressure of the pistons on the fluid through the action of the spring suspension.

12. A shock absorber for the spring suspension of a vehicle, comprising a casing open at one side; a cover to be removably secured to the open side to provide a fluid tight casing, said cover having diametrically opposite projections to extend into the casing to provide abutments therein; diametrically opposite wing pistons rotatably supported in the casing; and bowed spring members carried at opposite sides of the pistons to coöperate with the abutments, substantially as and for the purpose specified.

13. A shock absorber for the spring suspension of a vehicle, comprising a casing open at one side and having a radially extending arm and an axial opening in the wall opposite to the open end; a cover adapted to be adjustably connected to the open side of the casing to provide a fluid tight casing, said cover having diametrically opposite projections to extend into the casing to provide abutments therein and an axially extending recessed lug; diametrically opposite wing pistons having an axially extending trunnion to rotatably engage in the opening in the side wall of the casing, and an axial recess in the opposite side for the engagement of the cover lug to rotatably support the piston in the casing; an arm secured to the piston trunnion; a spring seated in the recess in the cover lug; and a pair of bowed spring members carried at opposite sides of the pistons, substantially as and for the purpose specified.

14. A shock absorber for the spring suspension of a vehicle, comprising a fluid carrying casing adapted to be pivotally connected to a part of the vehicle; an abutment in the casing; a piston to oscillate in the casing pivotally connected to another part of the vehicle; and a yielding member in the casing arranged to coöperate with the abutment to normally separate the casing into intercommunicating chambers, and operable to shut off or retard the movement of the fluid from one chamber to the other during the movement of the piston.

15. In a shock absorber for the spring suspension of a vehicle of the class specified, comprising a casing having an opening at one side and a radially extending arm to pivotally support the casing by a part of the vehicle; diametrically oppositely extending wing pistons having an axially projecting trunnion to extend through an axial opening in the casing; an arm secured to the piston projecting from the casing to pivotally support the piston by a part of the vehicle; a cover for the open side of the casing having projections to extend into the casing to provide abutments in the casing extending from the outer wall of the casing, said cover adapted to be secured to the casing with the abutments in different positions in the casing relative to the pistons; and bowed spring members at opposite sides and movable with the piston coöperating with the abutments to separate the casing at opposite sides of the piston into communicating chambers and to operate during the movement of the piston to retard the movement of the fluid from one chamber to the other.

Signed at New York city, in the county of New York and State of New York this 31st day of May, 1917.

ROBERT G. CLARK.

It is hereby certified that in Letters Patent No. 1,290,912, granted January 14, 1919, upon the application of Robert G. Clark, of Brooklyn, New York, for an improvement in "Shock-Absorbers," errors appear in the printed specification requiring correction as follows: Page 3, line 88, claim 7, for the word "and" read *an;* same page, lines 109 and 119, claims 9 and 10, after the word "casing" strike out the semicolon; same page and claims, lines 110 and 120, after the word "wall" insert a semicolon; and that the said Letters Patent should be read with these corrections therein that the same may conform to the record of the case in the Patent Office.

Signed and sealed this 11th day of March, A. D., 1919.

[SEAL.]

R. F. WHITEHEAD,
*Acting Commissioner of Patents.*

Cl. 21—105.